Aug. 1, 1950 J. G. OETZEL 2,516,903
ELECTRODYNAMIC BRAKE FOR AUTOMOTIVE VEHICLES
Original Filed May 2, 1942 2 Sheets-Sheet 1
Fig.1.
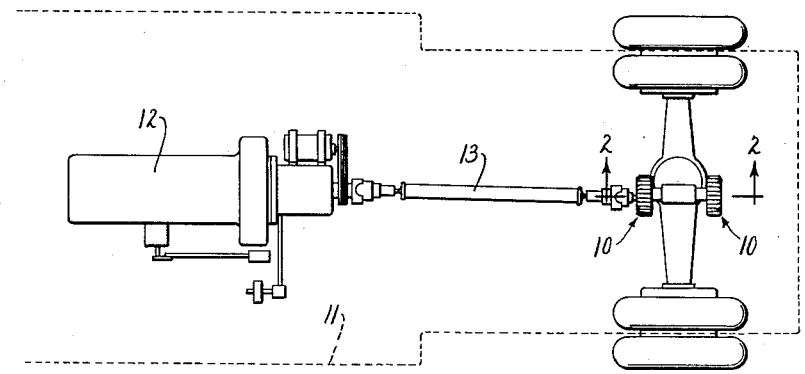
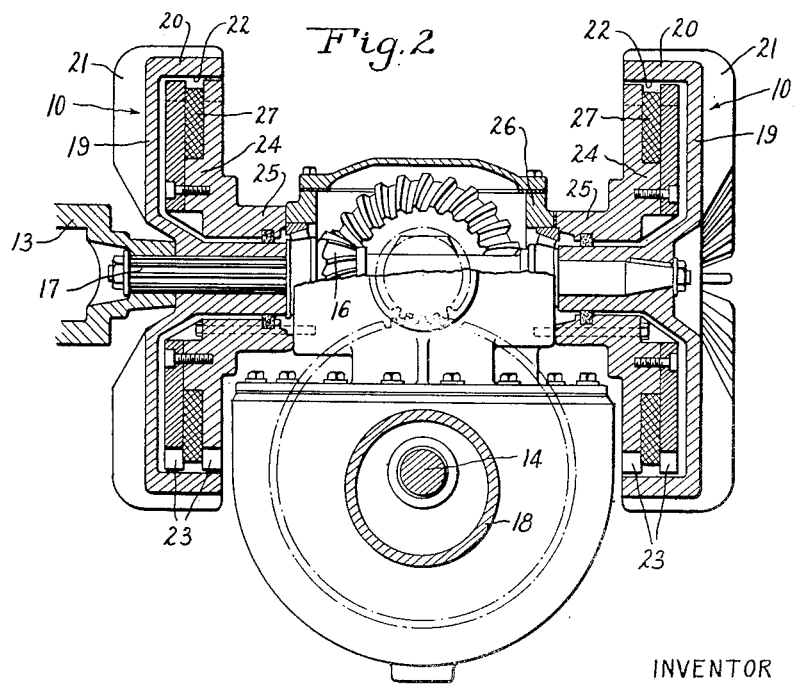
Fig.2
INVENTOR
John George Oetzel
BY Carlson, Pitzner, Hubbard Wolfe
ATTORNEYS INVENTOR
John George Oetzel
BY Carlson, Pitzner, Hubbard & Wolfe
ATTORNEYS Patented Aug. 1, 1950

2,516,903

UNITED STATES PATENT OFFICE 2,516,903

ELECTRODYNAMIC BRAKE FOR AUTOMOTIVE VEHICLES

John George Oetzel, Beloit, Wis., assignor to Warner Electric Brake Manufacturing Company, South Beloit, Ill., a corporation of Illinois Original application May 2, 1942, Serial No. 441,486. Divided and this application January 25, 1946, Serial No. 643,321

3 Claims. (Cl. 172—285)

This invention relates to electrodynamic brakes of the eddy curent type for retarding the motion of heavy road and rail vehicles.

The object is to mount an eddy current brake on an automotive vehicle in a novel manner such as to facilitate rapid heat dissipation and provide adequate road clearance.

Other objects and advantages of the invention will become apparent from the following detailed description taken in connection with the accompanying drawings, in which Figure 1 is a plan view of the wheel and axle assemblies and the power plant of a truck and semi-trailer combination equipped with eddy current brakes embodying the present invention, the truck and trailer bodies being shown in phantom.

Fig. 2 is a sectional view taken along the line 2—2 of Fig. 1.

Figure 3:
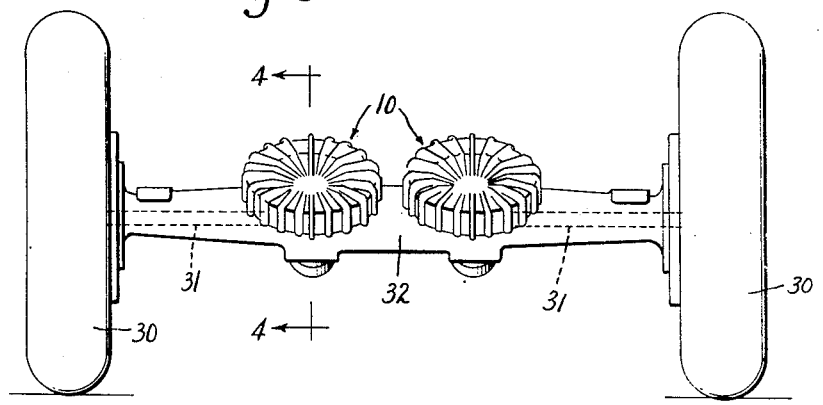
Fig. 3 is an elevational view of a trailer axle assembly, illustrating a modified form of drive for the eddy current brakes.

In accordance with the present invention, eddy current brakes indicated generally at 10 are associated singly or in tandem with the rear axle assembly of an automotive vehicle which, in the case of the truck 11 shown by way of illustration, may be powered by a motor 12 operating through the usual propeller shaft 13. The truck axle 14 is driven through speed reduction gearing including a bevel pinion 16 on a horizontal shaft 17 which extends longitudinally of the vehicle and is disposed somewhat above the axle housing 18. The shaft is detachably connected in the usual way to the propeller shaft 13 and therefore rotates at a speed considerably greater than the axle 14.

In the form of the invention shown in Figs. 1 and 2, an eddy current brake is provided at each end of the shaft 17. Each brake includes a metallic plate 19 fast on one end of the shaft 17 and having a peripheral flange or drum 20, preferably composed of cast iron and constituting the inductor element of the eddy current brake. To facilitate radiation of heat from the plate and flange, radially extending fins 21 are formed on the exterior of the plate and continue across the outer periphery of the drum which is of a diameter such that its periphery does not project materially below the axle housing 18. The internal drum surface 22 is smooth and is disposed close to the outwardly facing poles 23 of a magnet ring 24 whose hub 25 is bolted to the gear housing 26. An annular winding 27 is disposed between the poles which may, if desired, be constructed with annularly spaced teeth as shown.

When the winding 27 is energized, magnetic flux threads the circuit around the winding including the drum or inductor 20 creating eddy currents in the latter. The magnet being stationary, a retarding effect is thus exerted on the drum and therefore on the vehicle axle, the magnitude of this effect being proportional to the vehicle speed and the energizing current.

Figure 4:
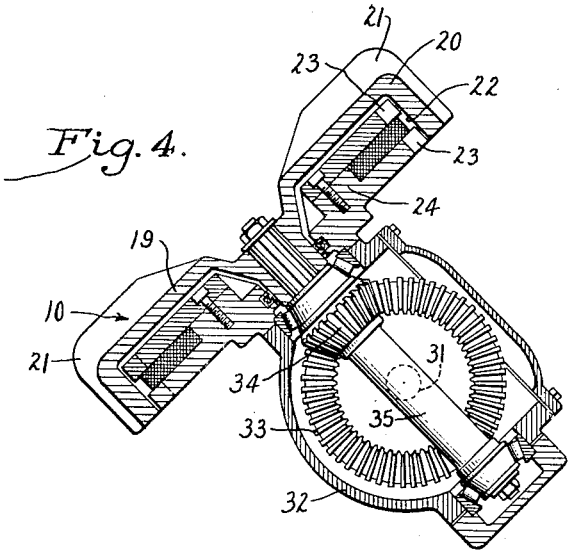
Fig. 4 is a sectional view taken along the line 4—4 of Fig. 3.

If desired, the same type axle construction may be provided on a trailer in order to obtain a high speed of the eddy current inductor. Or, a special axle may be employed as shown in Figs. 3 and 4. As before, the trailer wheels 30 are fast on separate axles 31 journaled in a housing 32 and each carrying a bevel gear 33 at its inner end meshing with a pinion 34. The latter is on a shaft 35 carrying the hub of the eddy current brake drum 20 which preferably is inclined forwardly as shown so as to intercept the air currents created by the vehicle motion. By employing separate axles 31, the necessity of a differential is avoided. The drums thus mounted to turn in planes inclined relative to the horizontal may be mounted side by side at substantially the same incline as shown in Fig. 3 or they may be positioned at different inclinations and thus angularly spaced around the axle housing thereby permitting the drum axes to be located closer together.

It will be observed that because of the gearing, the eddy current brake drums 20 are driven at speeds substantially greater, usually about six to ten times in standard trucks, than the wheel axles so that efficient electrodynamic action is obtained at relatively low vehicle speeds. Also, in both of the mountings disclosed, one or both of the drum plates 19 extends upwardly and faces forwardly so as to be impinged upon by the air currents created by the vehicle motion. These two factors together with the tandem arrangements combine to provide efficient cooling of the parts of the brakes so that the latter may be worked at high capacity. It is possible therefore to provide a substantial amount of frictionless auxiliary braking at a comparatively low cost.

This application is a division of my co-pending application Serial No. 441,486, filed May 2, 1942, now Patent 2,395,904, patented March 5, 1946.

I claim as my invention:

1. The combination of a vehicle having a rotary wheel axle, a housing therefor, a horizontal shaft disposed above said axle and extending longitudinally of the vehicle, means driving said shaft at a speed greater than the axle, annular magnet and inductor rings encircling said shaft and disposed above the bottom of said housing, said rings having concentric faces and coacting to form an eddy current brake, means anchoring one of said rings on said axle housing, and means fast on said shaft and supporting the other of said rings.

2. The combination of a vehicle having a rotary axle carrying wheels of the vehicle, a housing for said axle, a shaft journaled in said housing and driven in unison with the rotation of said axle at a speed greater than the axle speed, said shaft being disposed above and projecting upwardly from said axle in a plane perpendicular to the axle, annular magnet and inductor rings encircling said shaft and having concentric faces coacting to form an eddy current brake, means anchoring one of said elements on said axle housing, and means fast on said shaft and supporting the other of said elements.

3. The combination of a vehicle having a rotary axle carrying wheels of the vehicle, a housing for said axle, a shaft journaled in said housing and driven in unison with the rotation of said axle at a speed greater than the axle speed, said shaft being disposed above and lying in a plane perpendicular to the axle, annular magnet and inductor rings encircling said shaft and having concentric faces coacting to form an eddy current brake, blades rigid with said rotatable inductor ring and forming a fan for moving air around the parts of the brake, means anchoring one of said elements on said axle housing, and means fast on said shaft and supporting the other of said elements.

JOHN GEORGE OETZEL.

REFERENCES CITED

The following references are of record in the file of this patent:

UNITED STATES PATENTS

| Number | Name | Date |
|---|---|---|
| 1,479,463 | Entz | Jan. 1, 1924 |
| 1,839,096 | Haalmeijer et al. | Dec. 29, 1931 |
| 1,960,915 | Morse | May 29, 1934 |
| 2,006,785 | Baughman | July 2, 1935 |
| 2,035,047 | Cotter | Mar. 24, 1936 |
| 2,355,484 | Teker | Aug. 8, 1944 |
| 2,395,904 | Oetzel | Mar. 5, 1946 |

FOREIGN PATENTS

| Number | Country | Date |
|---|---|---|
| 8,570 | Great Britain | of 1905 |
| 12,416 | Switzerland | June 6, 1896 |